United States Patent [19]

Redifer

[11] 3,906,456

[45] Sept. 16, 1975

[54] REAL-TIME INDEX REGISTER

[75] Inventor: James L. Redifer, Timonium, Md.

[73] Assignee: The United States of America as represented by the Secretary of the Navy, Washington, D.C.

[22] Filed: Jan. 21, 1974

[21] Appl. No.: 435,376

[52] U.S. Cl. ............ 340/172.5; 235/92 DP; 328/48

[51] Int. Cl.$^2$ ............ H03K 23/00

[58] Field of Search ............ 235/92 CC; 328/48, 49; 340/172.5

[56] References Cited

UNITED STATES PATENTS

| | | | |
|---|---|---|---|
| 3,094,609 | 6/1963 | Weiss | 340/172.5 |
| 3,210,733 | 10/1965 | Terzian et al. | 340/172.5 |
| 3,426,296 | 2/1969 | Christiansen et al. | 328/48 |
| 3,586,835 | 6/1971 | Foch | 235/92 CC |
| 3,626,385 | 12/1971 | Bouman | 340/172.5 |
| 3,668,646 | 6/1972 | Hemdal | 340/172.5 |
| 3,674,991 | 7/1972 | Isvetkov et al. | 235/92 CC |
| 3,824,378 | 7/1974 | Johnson et al. | 328/48 |

*Primary Examiner*—Gareth D. Shaw
*Assistant Examiner*—Michael C. Sachs
*Attorney, Agent, or Firm*—R. S. Sciascia; P. Schneider; W. Ellis

[57] ABSTRACT

A counting-register whose enabling signal can be chosen from one of a group of synchronous frequencies for real-time measurement or from an incrementing signal from an iterative loop in a computer. This convertible register comprises two four-bit counters connected in series, an AND gate and a multiplexer to provide an enabling signal at one of the above-stated frequencies to the AND gate which applies the enable signal to the counters if the output from the last of the series counters is a one.

6 Claims, 2 Drawing Figures

REAL-TIME INDEX REGISTER

BACKGROUND OF THE INVENTION

1. Field of Invention

This invention relates to counting registers and in particular to frequency-convertible counting registers to be used with a computer.

2. Description of the Prior Art

In prior-art control system that use computers, two problems occur that to-date have been handled separately. They are the measurement of time delays (frequently called real-time measurements) and the measurement of iterative loops. Both of these functions require counter/divider chains. Time-delay measurements generally use a crystal oscillator or frequency source of one kind or another to count the delay. The output of this counter is then monitored either by a sense line of the computer or an interrupt function so that the computer program may be stopped at the end of an interval.

Iterative-loop measurements are generally made using a counter to keep track of the number of passes through the particular iterative-loop calculation. This counter can usually be preset, incremented, and detected, when full, completely under program control.

The use of a counter as an index register (iterative-loop counting) was the first to become available in general purpose computers. It essentially "grew up" inside the machine. The addition of the real-time clock came later as general computers began to be used in control systems that operated in "real time." These clocks were necessary to give the systems proper time synchronization. These clocks have always been considered a peripheral device and thus have not been incorporated into the actual computer itself.

Since these two functions are performed separately, prior art computers require a number of registers equal to the worst-case index-register load (the largest number of index registers required at one time) plus the worst case real-time clock-register load (largest number of real-time clocks required at one time). Thus the number of registers required for a single computer can become very large.

SUMMARY OF THE INVENTION

The present invention alleviates this hardware problem of the prior art by providing a convertible register which can be time-shared between these two functions. Thus the restriction of the number of registers to at least the sum of the real-time-clock worst-case load and the index-register worst-case load is eliminated and the new worst-case design is the maximum sum of the real-time clocks and the index registers required at any instant of time.

Briefly, this is accomplished by providing a register that can be used in a computer comprising a counter and circuitry that permits the frequency at which this counter is enabled to be selected from either a plurality of synchronous frequencies (real-time counting) or an incrementing frequency from an iterative loop in the computer. Thus this register can handle both real-time and iterative loop counting.

OBJECTS OF THE INVENTION

An object of the present invention is to reduce register hardware in a computer.

A further object of the present invention is to make each counting-register more versatile in its use in a system.

A still further object of the present invention is to reduce the number of registers required in a computer design.

Other objects, advantages and novel features of the present invention will become apparent from the following detailed description of the invention when considered in conjunction with the accompanying drawings.

DESCRIPTION OF THE PREFERRED EMBODIMENTS

Figure 1:
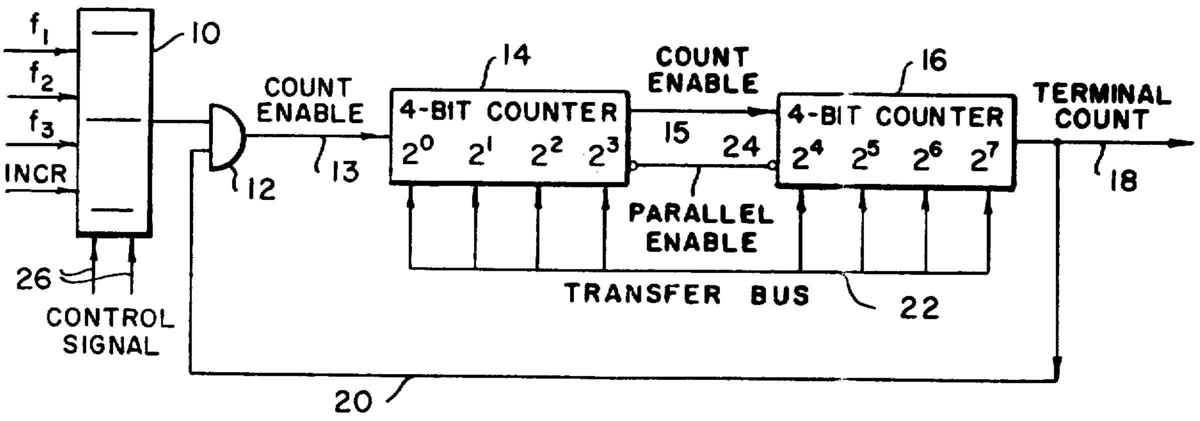
FIG. 1 is a block diagram of one embodiment of the present invention.

FIG. 1 shows one embodiment of the present invention. Two four-bit counters 14 and 16 are connected in series. The 93L16 four-bit counter put out by Advanced Micro Devices or by Fairchild Semiconductors may be used. A count-enable signal is applied to counter 14 on line 13 from AND gate 12 when both of its inputs are high.

Multiplexer 10 generates one of the inputs to the AND gate 12. The multiplexer 10 permits time-sharing of this register among a number of different computer functions. This is done by allowing a choice of one from a number of synchronous frequencies (real-time measurement) $F_1$, $F_2$, or $F_3$ or of the increment signal from an iterative loop in the computer to be applied as the multiplexer input to the AND gate 12. A two-bit word-control signal is applied on lines 26 to the multiplexer 10 from the Input/Output (I/O) interface. This control signal determines which of the three frequencies $F_1$, $F_2$, $F_3$ or the increment signal will be used as the count-enable signal.

The second input to the AND gate 12 is a feedback signal on line 20 from the output of the counter 16. The output of counter 16 is a 1 at every count until counter 16 is filled. When counter 16 is filled the output is a 0. Thus a 1 is applied to the second input of the AND gate 12 until the counter 16 becomes filled, at which point line 20 goes to 0 and the count-enable signal on line 13 is shut off.

The terminal count on line 18 is generally sensed by an instruction in the computer.

These two counters 14 and 16 can be set to any number from 0 to 256 ($4^2.4^2$) by the transfer bus 22 depending on the count interval or increment number desired. The parallel enable signal on line 24 is merely a strobe which is used once the complement of the count desired is set up in the transfer-bus lines to count the counters 14 and 16 to this number. Obviously, any number of counters could be used depending on the count desired as could any length counter.

Aside from the frequency-multiplexing function, this register acts as a normal index register. It can be loaded in ones complement, incremented, and the terminal count sensed by an instruction.

The only limitation on the utilization of this register is that it may not be used for both functions at the same time.

The basic novelty of this approach is that it allows time-sharing of a register between two functions that require similar hardware but in the past have traditionally been kept separate.

Figure 2:
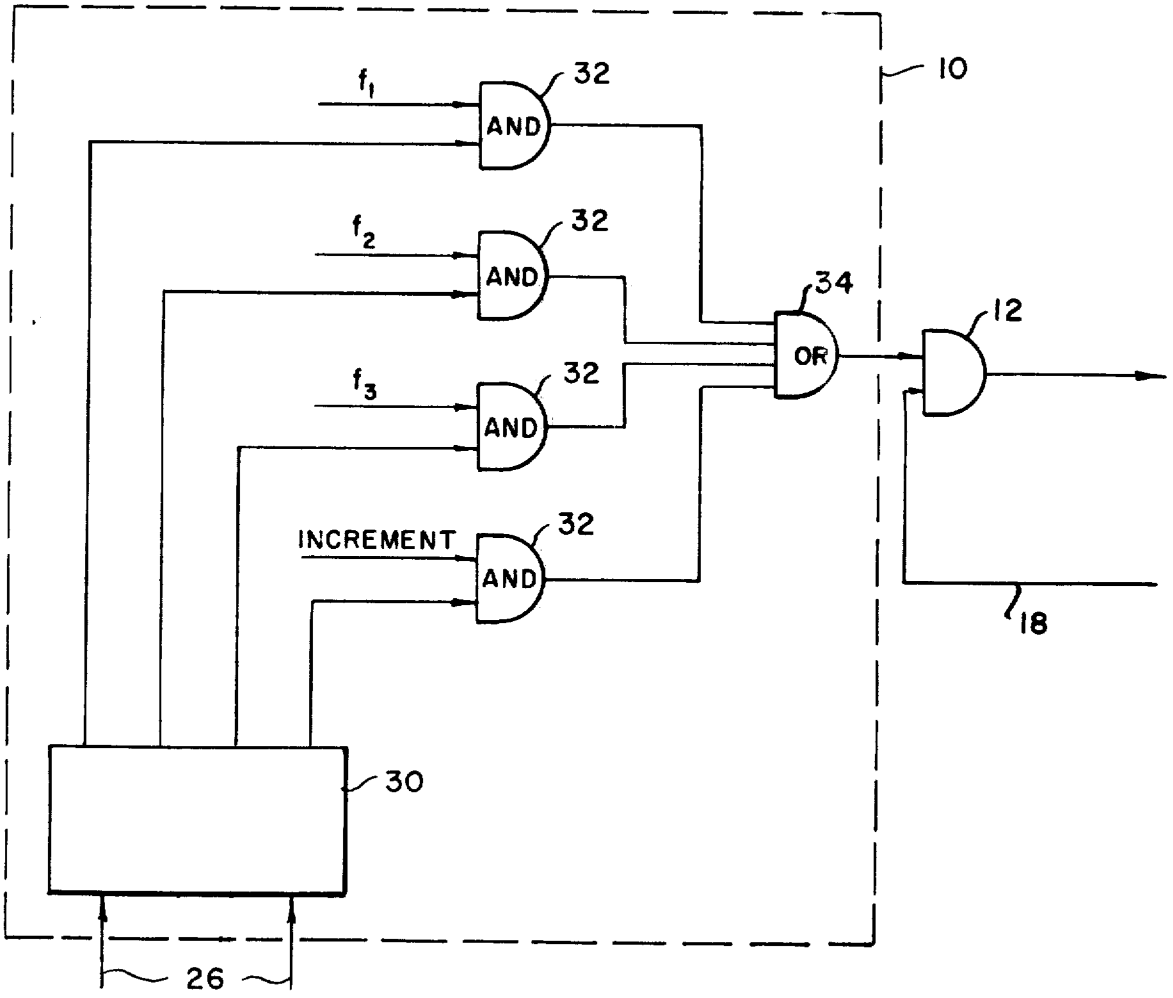
FIG. 2 is a block diagram of a multiplexer which can be employed in this invention.

FIG. 2 shows one possible design for multiplexer 10. The control signal on lines 26 is converted into four signals (one line high, the other line high, both high, both low) by block 30. Block 30 is a standard device that is manufactured by a number of electronics firms such as Advanced Micro-Devices or Fairchild Semiconductors. Specifically, a device that may be used for block 30 may be found in the "Advanced Micro Devices Data Book" at page 73, part number 93L09. Block 30 is a standard device labeled 93L09 in the catalogues put out by either Advanced Micro Devices or Fairchild Semiconductors. These four signals are then applied, one to each of a set of four AND gates 32. The other inputs to the four AND gates are $F_1$, $F_2$, $F_3$, and Increment.

One of these four AND gates will be energized by the control signal on line 26 and the frequency applied to that AND gate will be applied to the OR gate 34 which in turn will apply it as the multiplexer input to AND gate 12. Obviously any number of circuits could be developed to perform this multiplexing function.

Obviously, many modifications and variations of the present invention are possible in light of the above teachings. It is therefore to be understood that, within the scope of the appended claims, the invention may be practiced otherwise than as specifically described.

What is claimed is:

1. A real-time index register for use in a computer comprising:

counting means;

multiplexing means for providing an enable signal to step said counting means, said multiplexing means receiving a plurality of simultaneously available, different-frequency signals and one or more incrementing signals from iterative loops in said computer and permitting a selected one of these signals to pass as said enabling signal to said counting means; and feedback means for applying the output from said counting means to said multiplexing means to enable or disable said multiplexing means from applying said enable signal to said counting means in accordance with the output from said counting means.

2. A real-time, index register as in claim 1, wherein said counting means comprises two four-bit counters connected in series.

3. A real-time, index register as in claim 1, wherein the plurality of frequencies which can be used as the enable signal are synchronous frequencies.

4. A real-time index register as in claim 3, wherein said multiplexing means comprises:

a multiplex circuit to which the plurality of frequency signals and the one or more incrementing signals from the computer iterative loops are applied as one set of inputs, and to which a control signal is applied as another input which determines which of the plurality of frequency signals or the one or more incrementing signals will be used as the enable signal; and gate means to which the enable signal from said multiplex circuit is applied as one input, and to which the signal from said feedback means is applied as the other input to determine whether the enable signal is to be applied to said counting means.

5. A real-time, index register for use in a computer comprising:

counting means;

frequency-generator means for generating a plurality of different-frequency signals simultaneously, each on a different line;

multiplexing means comprising a plurality of gate means, each gate means having applied to one of its inputs either a different increment signal from the iterative loops in said computer or a different frequency signal from said plurality of frequency lines from said frequency-generation means and, at another of its inputs a control signal, the control signal being set to open a selected one of said gate means at the occurrence of a frequency or increment signal so that said frequency or increment signal is applied to step said counting means; and feedback means for applying the output from said counting means to said multiplexing means to enable or disable said multiplexing means from applying a signal to step said counting means in accordance with the output from said counting means.

6. A real-time, index register as defined in claim 5 wherein said multiplexing means comprises an enable gate to which the counter-stepping signal from said selected one of said gate means is applied as one input, and to which the signal from said feedback means is applied as the other input to determine whether this stepping signal is to be applied to said counting means.

* * * * *